United States Patent
Schreiber et al.

(10) Patent No.: US 6,944,822 B1
(45) Date of Patent: Sep. 13, 2005

(54) METHOD AND APPARATUS FOR PREVENTING REUSE OF TEXT, IMAGES, AND SOFTWARE TRANSMITTED VIA NETWORKS

(75) Inventors: Daniel Schreiber, Beit Shemesh (IL); David Guedaliah, Beit Shemesh (IL)

(73) Assignee: Finjan Software, Ltd., South Netanya (IL)

( * ) Notice: Subject to any disclaimer, the term of this patent is extended or adjusted under 35 U.S.C. 154(b) by 688 days.

(21) Appl. No.: 09/595,814

(22) Filed: Jun. 16, 2000

Related U.S. Application Data

(62) Division of application No. 09/313,067, filed on May 17, 1999, now Pat. No. 6,209,103.

(30) Foreign Application Priority Data

Jun. 14, 1998  (IL)  ...................................... 124895

(51) Int. Cl.⁷ .......................... G06F 16/00; G06F 17/21
(52) U.S. Cl. .................. 715/531; 715/501.1; 715/523; 715/530; 709/219; 709/246; 713/260; 713/201; 713/202
(58) Field of Search ............................. 715/501.1, 513, 715/523, 530, 531; 709/219, 246; 713/200, 713/201, 202

(56) References Cited

U.S. PATENT DOCUMENTS

| | | | |
|---|---|---|---|
| 4,405,829 A | 9/1983 | Rivest et al. ................. | 380/30 |
| 4,827,508 A | 5/1989 | Shear .......................... | 705/53 |
| 4,977,594 A | 12/1990 | Shear .......................... | 705/53 |
| 5,012,232 A | 4/1991 | Fadem ......................... | 345/25 |
| 5,050,213 A | 9/1991 | Shear .......................... | 705/53 |
| 5,303,370 A | 4/1994 | Brosh et al. .................. | 380/51 |
| 5,410,598 A | 4/1995 | Shear .......................... | 705/53 |
| 5,509,070 A | 4/1996 | Schull ......................... | 705/54 |
| 5,533,124 A | 7/1996 | Smith et al. .................. | 705/57 |
| 5,636,292 A | 6/1997 | Rhoads ....................... | 382/232 |
| 5,638,513 A | 6/1997 | Ananda ....................... | 713/202 |
| 5,642,207 A | 6/1997 | Smitt .......................... | 358/474 |
| 5,710,834 A | 1/1998 | Rhoads ....................... | 382/232 |
| 5,715,403 A | 2/1998 | Stefik ......................... | 705/44 |
| 5,721,788 A | 2/1998 | Powell et al. ............... | 382/100 |
| 5,745,254 A | 4/1998 | Satou ......................... | 358/412 |
| 5,745,360 A * | 4/1998 | Leone et al. ................ | 715/513 |
| 5,745,604 A | 4/1998 | Rhoads ....................... | 382/232 |
| 5,748,763 A | 5/1998 | Rhoads ....................... | 382/115 |
| 5,748,783 A | 5/1998 | Rhoads ....................... | 382/232 |
| 5,754,170 A | 5/1998 | Ranganathan ............... | 345/558 |
| 5,758,068 A | 5/1998 | Brandt et al. ............... | 713/200 |

(Continued)

FOREIGN PATENT DOCUMENTS

WO    WO 98/44424    * 10/1998    ........... G06F 13/00

OTHER PUBLICATIONS

Mynatt et al., "Nonvisual Presentation of Graphical User Interfaces: Contrasting Two Apporoaches", 1994, ACM, pp. 166-172.*

(Continued)

*Primary Examiner*—Sanjiv Shah
*Assistant Examiner*—Almari Yuan
(74) *Attorney, Agent, or Firm*—Squire, Sanders & Dempsey, L.L.P.

(57) ABSTRACT

A method for providing textual information in a network environment, the method comprising: receiving a request via a network for text-editable textual information; converting the text-editable textual information into a non-text-editable textual format on line upon receiving the request; and sending the non-text-editable textual information via the network. Network-based systems are also disclosed.

8 Claims, 9 Drawing Sheets

U.S. PATENT DOCUMENTS

| | | | |
|---|---|---|---|
| 5,765,152 A | 6/1998 | Erickson | 707/9 |
| 5,768,426 A | 6/1998 | Rhoads | 382/232 |
| 5,781,914 A * | 7/1998 | Stork et al. | 715/506 |
| 5,790,117 A | 8/1998 | Halviatti et al. | 345/744 |
| 5,801,679 A | 9/1998 | McCain | 345/856 |
| 5,801,689 A * | 9/1998 | Huntsman | 345/733 |
| 5,805,724 A | 9/1998 | Metcalfe et al. | 382/176 |
| 5,809,160 A | 9/1998 | Powell et al. | 382/100 |
| 5,822,436 A | 10/1998 | Rhoads | 380/54 |
| 5,832,119 A | 11/1998 | Rhoads | 382/232 |
| 5,835,722 A | 11/1998 | Bradshaw et al. | 709/225 |
| 5,838,902 A | 11/1998 | Shin | 713/200 |
| 5,841,886 A | 11/1998 | Rhoads | 382/115 |
| 5,841,978 A | 11/1998 | Rhoads | 709/217 |
| 5,850,481 A | 12/1998 | Rhoads | 382/232 |
| 5,862,260 A | 1/1999 | Rhoads | 382/232 |
| 5,870,544 A | 2/1999 | Curtis | 713/201 |
| 5,872,915 A | 2/1999 | Dykes et al. | 713/202 |
| 5,875,296 A | 2/1999 | Shi et al. | 713/202 |
| 5,881,287 A | 3/1999 | Mast | 717/127 |
| 5,892,900 A | 4/1999 | Ginter et al. | 713/200 |
| 5,905,505 A | 5/1999 | Lesk | 345/630 |
| 5,920,848 A | 7/1999 | Schutzer et al. | 705/42 |
| 5,968,119 A * | 10/1999 | Stedman et al. | 709/219 |
| 5,974,441 A | 10/1999 | Rogers et al. | 709/200 |
| 5,982,931 A | 11/1999 | Ishimaru | 382/218 |
| 5,991,399 A | 11/1999 | Graunke et al. | 380/279 |
| 5,999,941 A | 12/1999 | Andersen | 707/103 |
| 6,009,410 A | 12/1999 | LeMole et al. | 705/14 |
| 6,011,905 A | 1/2000 | Huttenlocher et al. | 358/1.2 |
| 6,014,702 A | 1/2000 | King et al. | 709/227 |
| 6,032,150 A | 2/2000 | Nguyen | 707/102 |
| 6,055,530 A * | 4/2000 | Sato | 707/3 |
| 6,088,355 A | 7/2000 | Mills et al. | 370/392 |
| 6,205,480 B1 | 3/2001 | Broadhurst et al. | 709/225 |
| 6,236,387 B1 * | 5/2001 | Imada | 715/513 |
| 6,240,450 B1 | 5/2001 | Sharples et al. | 709/224 |
| 6,260,141 B1 | 7/2001 | Park | 713/155 |
| 6,289,137 B1 | 9/2001 | Sugiyama et al. | 382/299 |
| 6,298,422 B1 | 10/2001 | Spilo et al. | 711/154 |
| 6,343,274 B1 | 1/2002 | McCollom et al. | 205/26 |
| 6,343,738 B1 | 2/2002 | Ogilvie | 235/381 |
| 6,463,467 B1 | 10/2002 | Mages et al. | 709/218 |
| 6,601,108 B1 * | 7/2003 | Marmor | 709/246 |

OTHER PUBLICATIONS

Stirland, Sarah; ActiveX vs. Java, Wall Street & Technology, vol. 15, No. 8, p48, Aug. 1997.

Web Page Article "Chapter 3: Understanding Image Guardian", last updated Jan. 29, 1997, Printed Jun. 26, 2000; 3 pages URL: http://www.maximized.com/products/imageguardian/docks/chap3.htm.

Web Page Article "Chapter 3: Understanding WebReferee", last updated Dec. 9, 1996, Printed Sep. 11, 1998, 3 pages URL: http://www.maximized.com/products/webreferee/docks/chp3.htm.

Web Page Article "Copysight", Copyright 1999 Intellectual Protocols, LLC®, 8 pages URL: http://www.ip2.com/keith/products.htm.

Web Page Article "Track Images Across The Web", Copyright 1996-99 Digimarc Corporation, All rights reserved, 9 pages htt://www.digimarc.com/applications/copyright/copyright_bod.htm.

Web Page Article "Digital Rights Management", Copyright 1996-1998 InterTrust Technologies Corporation, All rights reserved, 8 pages http://www.intertrust.com/drm/drm.htm.

Web Page Article "Welcome to SafeMedia" Copyright SafeMedia [SM], SafeMedia is a service mark of Internet Expressions, Inc., Last Updated: May 29, 1999, 19 pages http:www.safemedia.com.

"Products—SiteShield—Copyright Issues", Dated Sep. 11, 1998, 4 pages, Copyright 1997 Maximized Software, Inc.

Press Release "Maximized Software Launches Deterrent Against Internet Copyright Pirates", SiteShield: New Product PR, Dated Sep. 11, 1998, 2 pages, Copyright 1996 Maximized Software Inc.

Web Page Article "Softlock" Copyright 1992-1999, Softlock.com, Inc. Dated Jun. 3, 1999, 13 pages URL:http://www.softlock.com.

David Strom, "Browser—Protect Your image on the Web", ZD Net Site, Kingston, Dated Sep. 11, 1998, 4 pages.

* cited by examiner

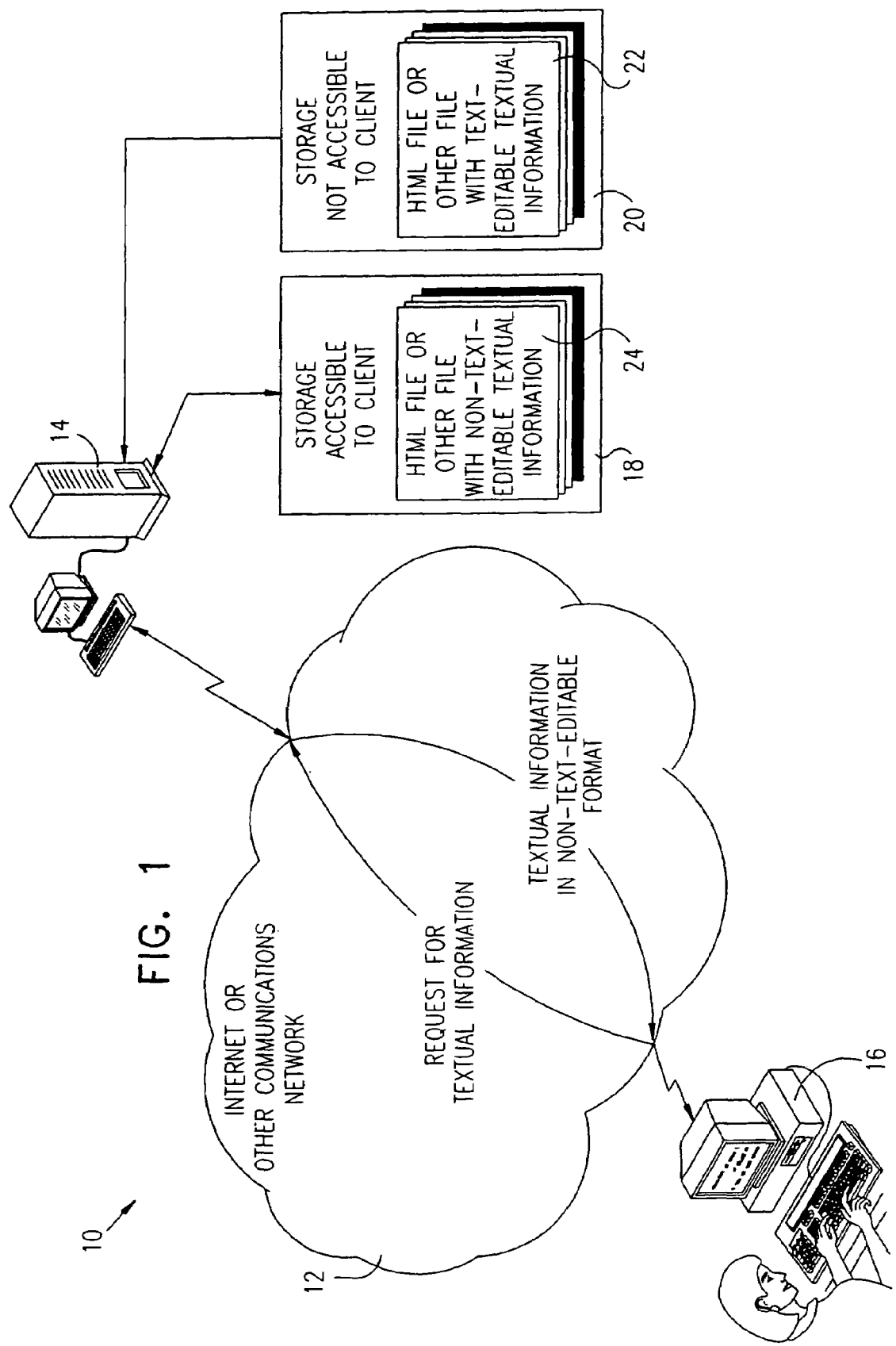

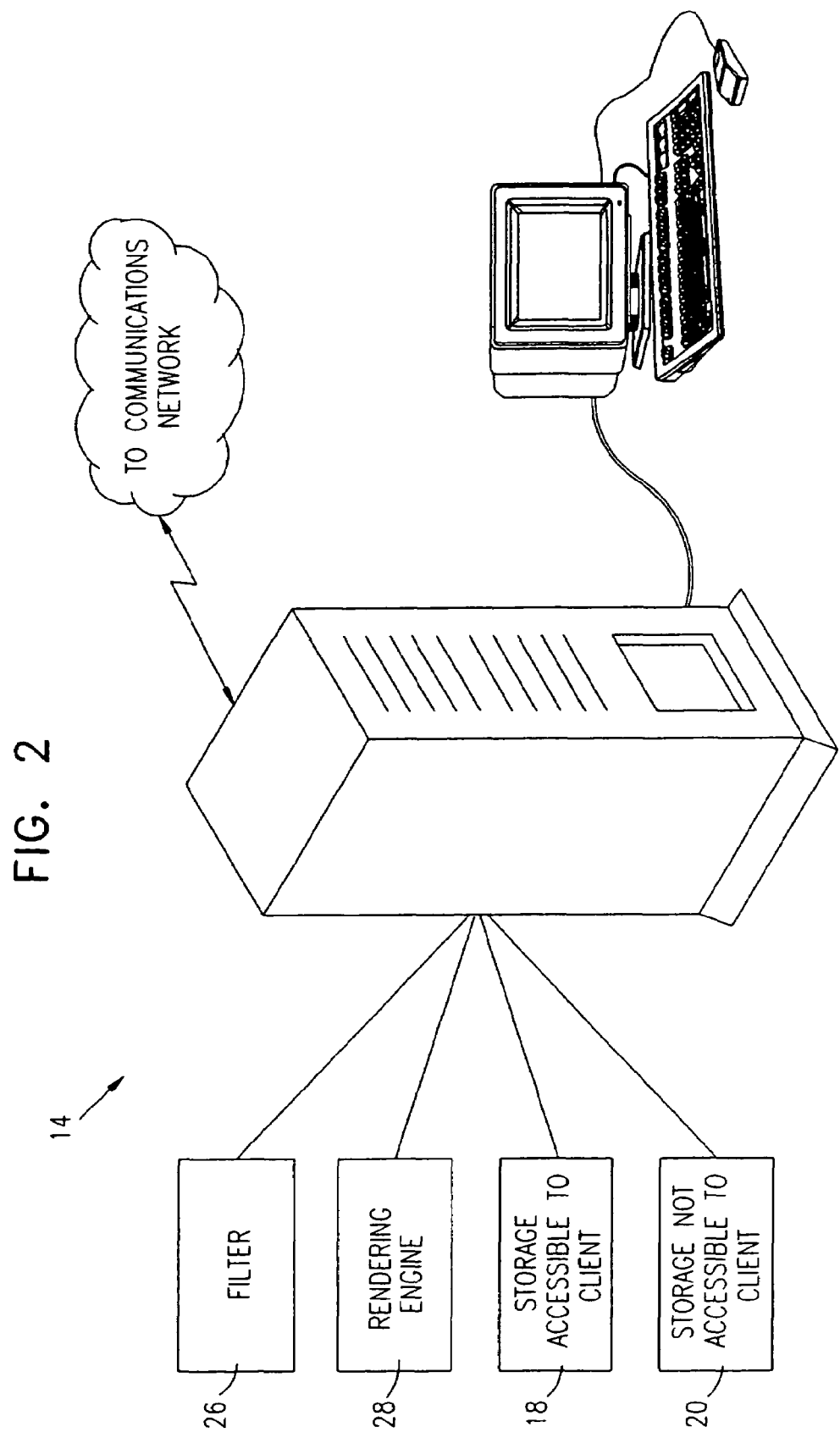

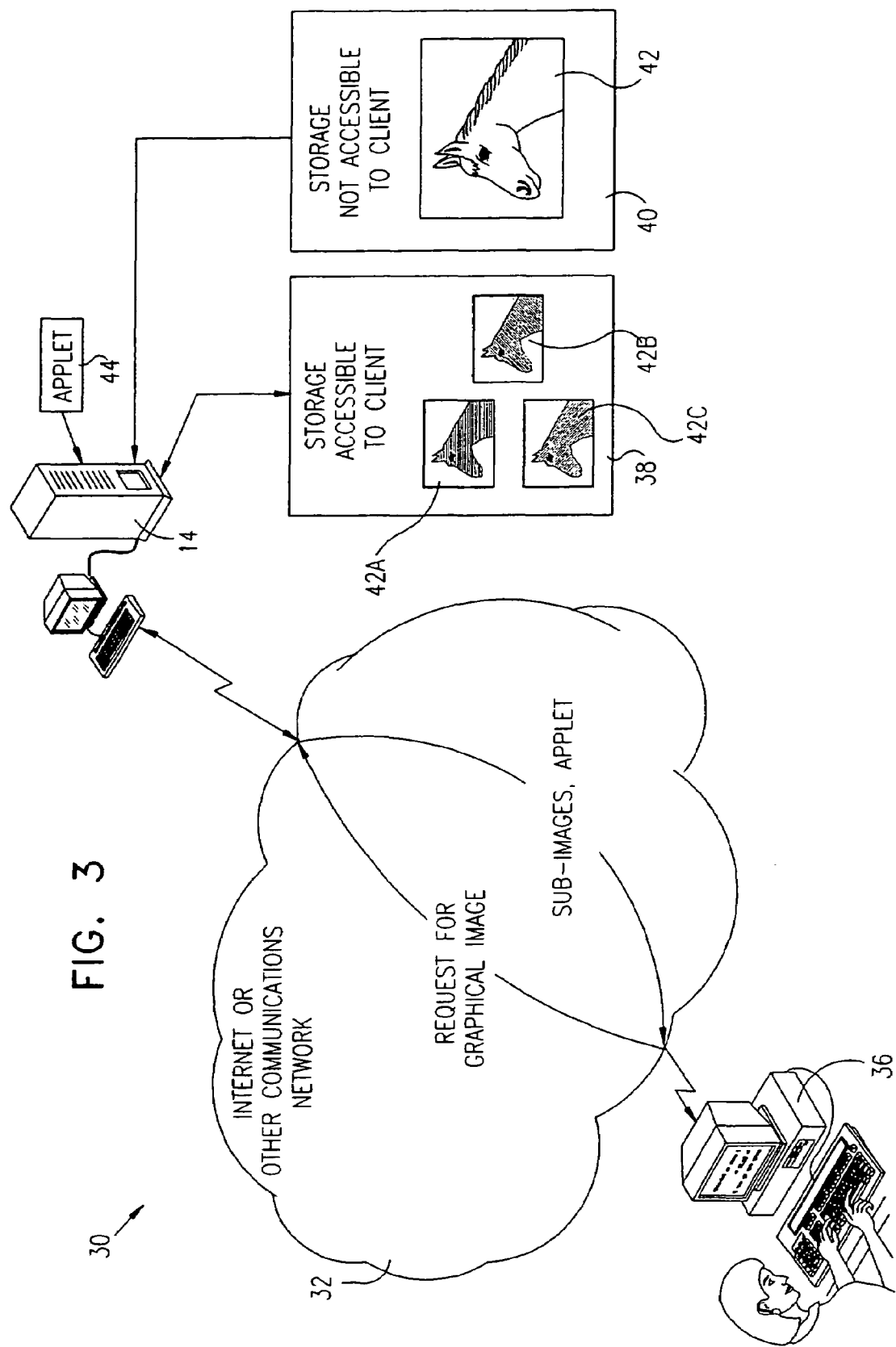

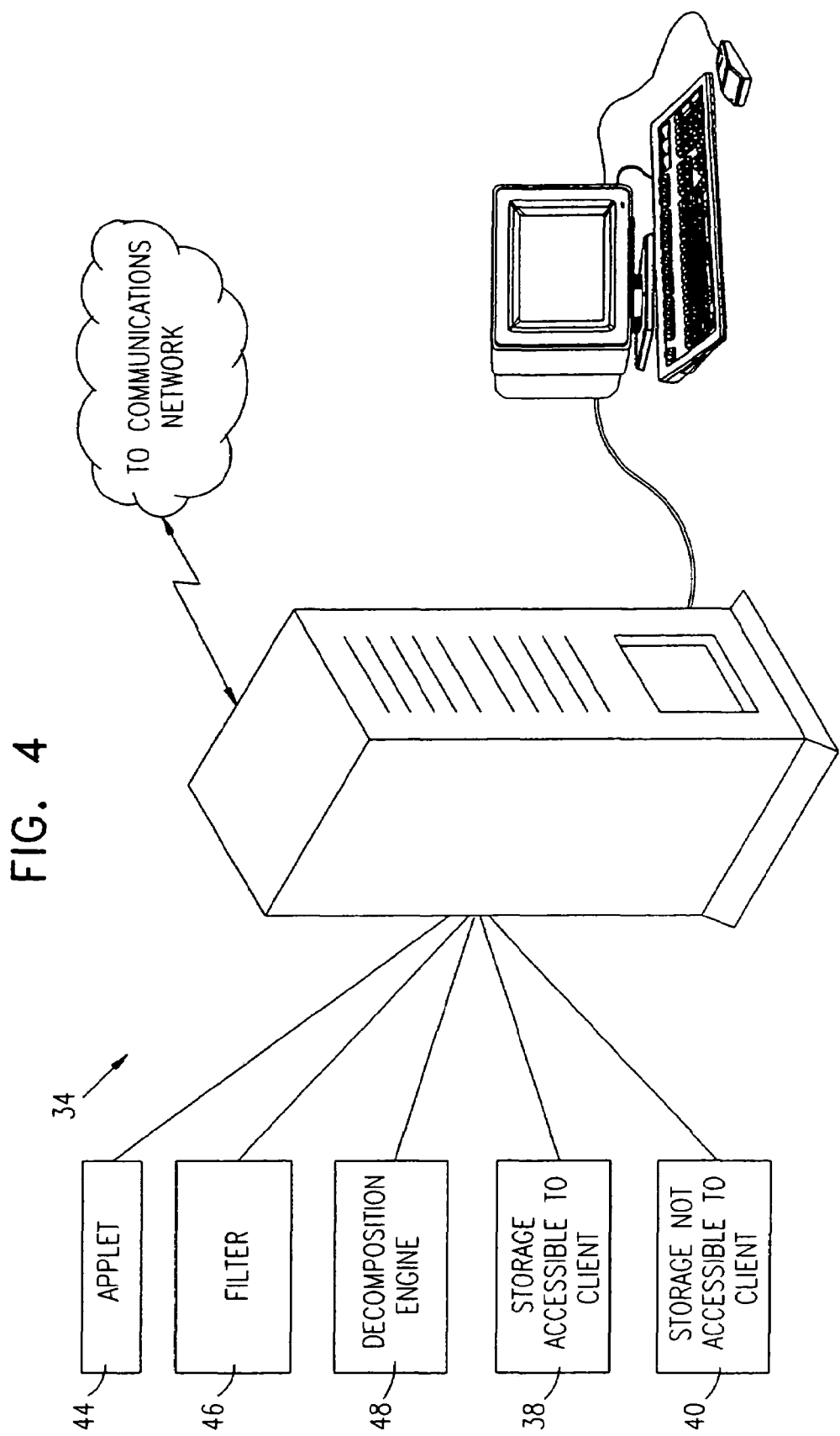

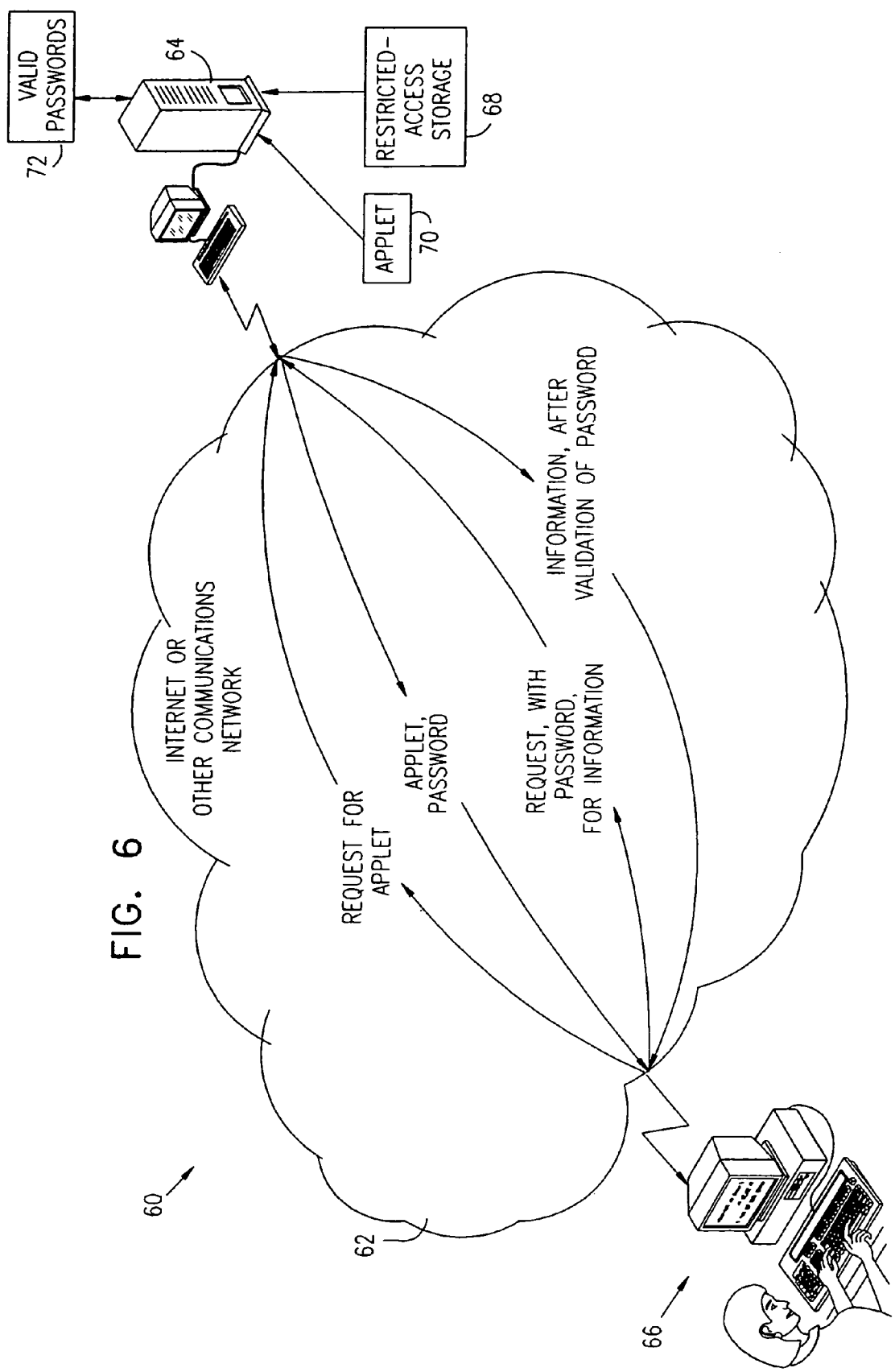

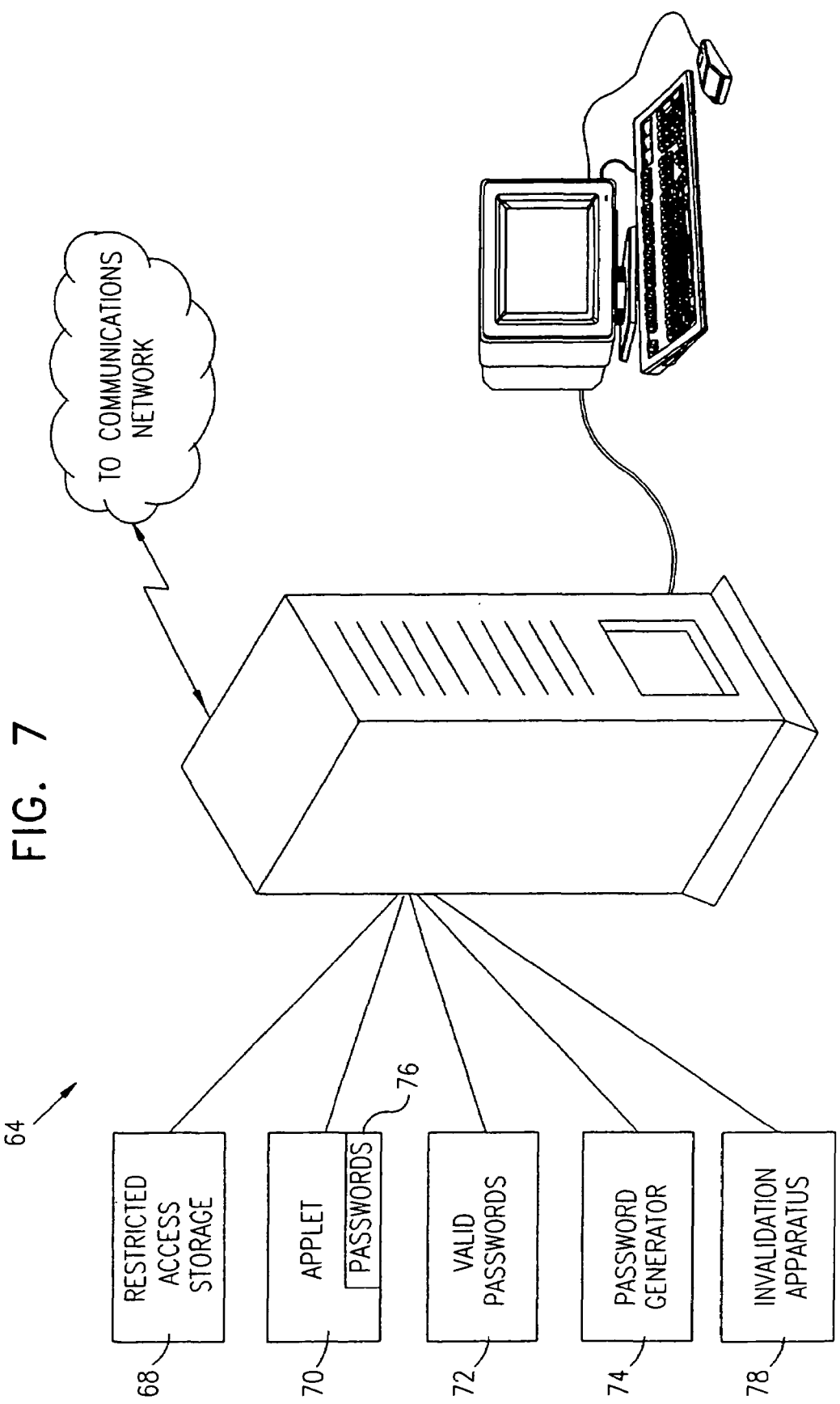

METHOD AND APPARATUS FOR PREVENTING REUSE OF TEXT, IMAGES, AND SOFTWARE TRANSMITTED VIA NETWORKS

This application is a divisional application of U.S. application Ser. No. 09/313,067 of Schreiber et al., filed May 17, 1999 now U.S. Pat. No. 6,209,103.

FIELD OF THE INVENTION

The present invention relates to network security in general and particularly to methods and apparatus for preventing unauthorized reuse of text, images, and software transmitted via networks.

BACKGROUND OF THE INVENTION

Sending text, images, and software via communications networks, particularly computer networks, is known. In one well known network protocol, the Hypertext Transport Protocol or HTTP, best known as a transport protocol for the Internet-based World Wide Web or WWW, a computer terminal or "client" connected to a network, such as the Internet, typically sends a request using software known as a "browser" to a server also connected to the network. Such requests may be for "Web pages," documents constructed using Hypertext Markup Language or HTML and stored at the server, which are then rendered by the client browser into text and/or images. Other requests may be for software applications such as "applets" which are executed by an application engine at the client. Upon receiving a request, the server sends that which was requested to the client.

Preventing unauthorized reuse of text, images, and software provided via networks is difficult given the current state of the art. Text is usually provided in text-editable format which may be copied and reused at the client. While text may be converted to a graphic image at the server and thus provided in a non-text-editable format to the client, this is not practicable both due to the increased storage required to store text as graphic images on the server, as well as the dynamic nature of requests such as search queries where the text results are not known until the query is executed and, therefore, the text cannot be converted to a graphic ahead of time. Images may be captured at the client from the client's video buffer and reused. Software applications including applets may be decompiled and reused at a later date where a time-limited or access-limited use was originally intended.

SUMMARY OF THE INVENTION

The present invention seeks to provide improved methods and apparatus for preventing unauthorized reuse of text, images, and software transmitted via networks. Text documents, and particularly HTML documents, from which text can be copied are rendered into non-text-editable graphical images at the server upon receiving a request from a client. Graphic images are rendered into a number of sub-images at the server upon receiving a request from a client. The sub-images are then sent to the requesting client together with an applet for displaying the sub-images in a manner that is visually perceived to substantially resemble the graphical image but which cannot be copied simply by taking a snapshot of the client's video buffer. Software applications including applets are provided with an embedded password that may be authenticated by a server to allow access to information for a limited time or under limited conditions. The password is invalidated at a predetermined time of based upon certain conditions, thus preventing future reuse and access to server information.

There is thus provided in accordance with a preferred embodiment of the present invention a method for providing textual information in a network environment, the method including receiving a request via a network for text-editable textual information, converting the text-editable textual information into a non-text-editable textual format on line upon receiving the request, and sending the non-text-editable textual information via the network.

Further in accordance with a preferred embodiment of the present invention the converting step includes converting the text-editable textual information into a non-text-editable graphical representation of the text-editable textual information.

Still further in accordance with a preferred embodiment of the present invention the converting step includes converting the text-editable textual information into the non-text-editable graphical representation the graphical representation includes at least one hyperlink.

Additionally in accordance with a preferred embodiment of the present invention the method further includes displaying the non-text-editable textual information via a computer terminal display.

Moreover in accordance with a preferred embodiment of the present invention the receiving step includes receiving the request from a computer terminal connected to the network at a server connected to the network, the converting step is performed at the server, and the sending step includes the server sending the non-text-editable textual information to the computer terminal via the network.

There is also provided in accordance with a preferred embodiment of the present invention a method for providing graphical information in a network environment, the method including receiving a request via a network for a graphical image, rendering the graphical image into a plurality of sub-images on line upon receiving the request, the sub-images are displayable in a manner that is visually perceived to substantially resemble the graphical image, and displaying the plurality of sub-images in the manner on a display via a video buffer the video buffer includes no more than one of the sub-images in its entirety at any given time.

Further in accordance with a preferred embodiment of the present invention the rendering step includes rendering the graphical image into a plurality of color separations of the graphical image.

Still further in accordance with a preferred embodiment of the present invention the rendering step includes rendering the graphical image into a plurality of sub-images the any of the plurality of sub-images includes an interference pattern.

Additionally in accordance with a preferred embodiment of the present invention the method further includes sending the plurality of sub-images via the network.

Moreover in accordance with a preferred embodiment of the present invention the displaying step includes displaying the plurality of sub-images via a computer terminal display.

Further in accordance with a preferred embodiment of the present invention the receiving step includes receiving the request from a computer terminal connected to the network at a server connected to the network the rendering step is performed at the server, the method further includes sending the plurality of sub-images to the computer terminal via the network, and the displaying step includes displaying the plurality of sub-images via a computer terminal display.

There is also provided in accordance with a preferred embodiment of the present invention a method for limiting the operational life of software in a network environment, the method including providing a software application with an associated password to a client via a network, receiving a request for information from the software application via the network, the request including the associated password, authenticating the password, providing the information to the software application via the network while the associated password is valid, and invalidating the password coincident with an invalidation event.

Further in accordance with a preferred embodiment of the present invention the invalidating step includes invalidating the password at a predetermined time.

Still further in accordance with a preferred embodiment of the present invention the invalidating step includes invalidating the password after a predetermined elapsed time from when the request was received.

Additionally in accordance with a preferred embodiment of the present invention the invalidating step includes invalidating the password upon the detection of a loss of communication with the client.

Moreover in accordance with a preferred embodiment of the present invention the providing step includes providing the software application in the form of an applet.

Further in accordance with a preferred embodiment of the present invention the providing step includes providing the password assembled with the software application.

Still further in accordance with a preferred embodiment of the present invention the providing step includes generating the password at a server upon receiving the request at the server.

There is also provided in accordance with a preferred embodiment of the present invention a network-based textual information system including a computer terminal operative to send a request via a network for text-editable textual information, and a server operative to receive the request, convert the text-editable textual information into a non-text-editable textual format on line upon receiving the request, and send the non-text-editable textual information to the computer terminal via the network.

Further in accordance with a preferred embodiment of the present invention the non-text-editable textual format includes a non-text-editable graphical representation of the text-editable textual information.

Still further in accordance with a preferred embodiment of the present invention the non-text-editable graphical representation includes at least one hyperlink.

Additionally in accordance with a preferred embodiment of the present invention the server further includes a first storage area that is inaccessible to the computer terminal for storing the text-editable textual information and a second storage area that is accessible to the computer terminal for storing the non-text-editable textual information.

There is also provided in accordance with a preferred embodiment of the present invention a network-based graphical information system including a computer terminal operative to send a request via a network for a graphical image, and a server operative to receive the request, render the graphical image into a plurality of sub-images on line upon receiving the request, the sub-images are displayable in a manner that is visually perceived to substantially resemble the graphical image, and send the sub-images to the computer terminal via the network.

Further in accordance with a preferred embodiment of the present invention the computer terminal is operative to display the plurality of sub-images in the manner on a display via a video buffer the video buffer includes no more than one of the sub-images in its entirety at any given time.

Still further in accordance with a preferred embodiment of the present invention the plurality of sub-images includes a plurality of color separations of the graphical image.

Additionally in accordance with a preferred embodiment of the present invention any of the plurality of sub-images includes an interference pattern.

There is also provided in accordance with a preferred embodiment of the present invention a network-based software authentication system including a server including a password generator, password validation apparatus, a restricted-access storage area, a software application, and invalidation apparatus, the server is operative to a) cause the password generator to generate a password, b) provide the software application with the password to a client via a network, c) receive a request for information from the software application via the network, the request including the associated password, d) authenticate the password using the password validation apparatus, e) provide the information to the software application via the network while the associated password is valid, and f) invalidate the password using the invalidation apparatus coincident with an invalidation event.

Further in accordance with a preferred embodiment of the present invention the invalidation event includes the arrival of a predetermined time.

Still further in accordance with a preferred embodiment of the present invention the invalidation event includes the elapsing of a predetermined elapsed time from when the request was received.

Additionally in accordance with a preferred embodiment of the present invention the invalidation event includes the detection of a loss of communication with the client.

Moreover in accordance with a preferred embodiment of the present invention the software application includes an applet.

Further in accordance with a preferred embodiment of the present invention the password is assembled with the software application.

Still further in accordance with a preferred embodiment of the present invention the password is generated at the server upon receiving the request at the server.

It is noted that throughout the specification and claims the term "user" as it is used with respect to the use of a computer may refer to a human or surrogate therefor in combination with the computer terminal with which the human or surrogate interacts. Thus, unless otherwise specified, a reference to a user may connote a reference to the user's computer terminal, and a reference to a user's computer terminal may connote a reference to the user.

BRIEF DESCRIPTION OF THE DRAWINGS

The present invention will be understood and appreciated more fully from the following detailed description, taken in conjunction with the drawings in which:

FIG. 1 is a simplified pictorial illustration of a system for preventing unauthorized reuse of text, the system constructed and operative in accordance with a preferred embodiment of the present invention;

FIG. 2 is a simplified block diagram of server 14 of FIG. 1;

FIG. 3 is a simplified pictorial illustration of a system for preventing unauthorized reuse of graphical images, the system constructed and operative in accordance with a preferred embodiment of the present invention;

FIG. 4 is a simplified block diagram of server 34 of FIG. 3;

FIG. 6 is a simplified pictorial illustration of a system for preventing unauthorized reuse of software applications, the system constructed and operative in accordance with a preferred embodiment of the present invention; and FIG. 7 is a simplified block diagram of server 64 of FIG. 6.

DETAILED DESCRIPTION OF PREFERRED EMBODIMENTS

Figure 5A:
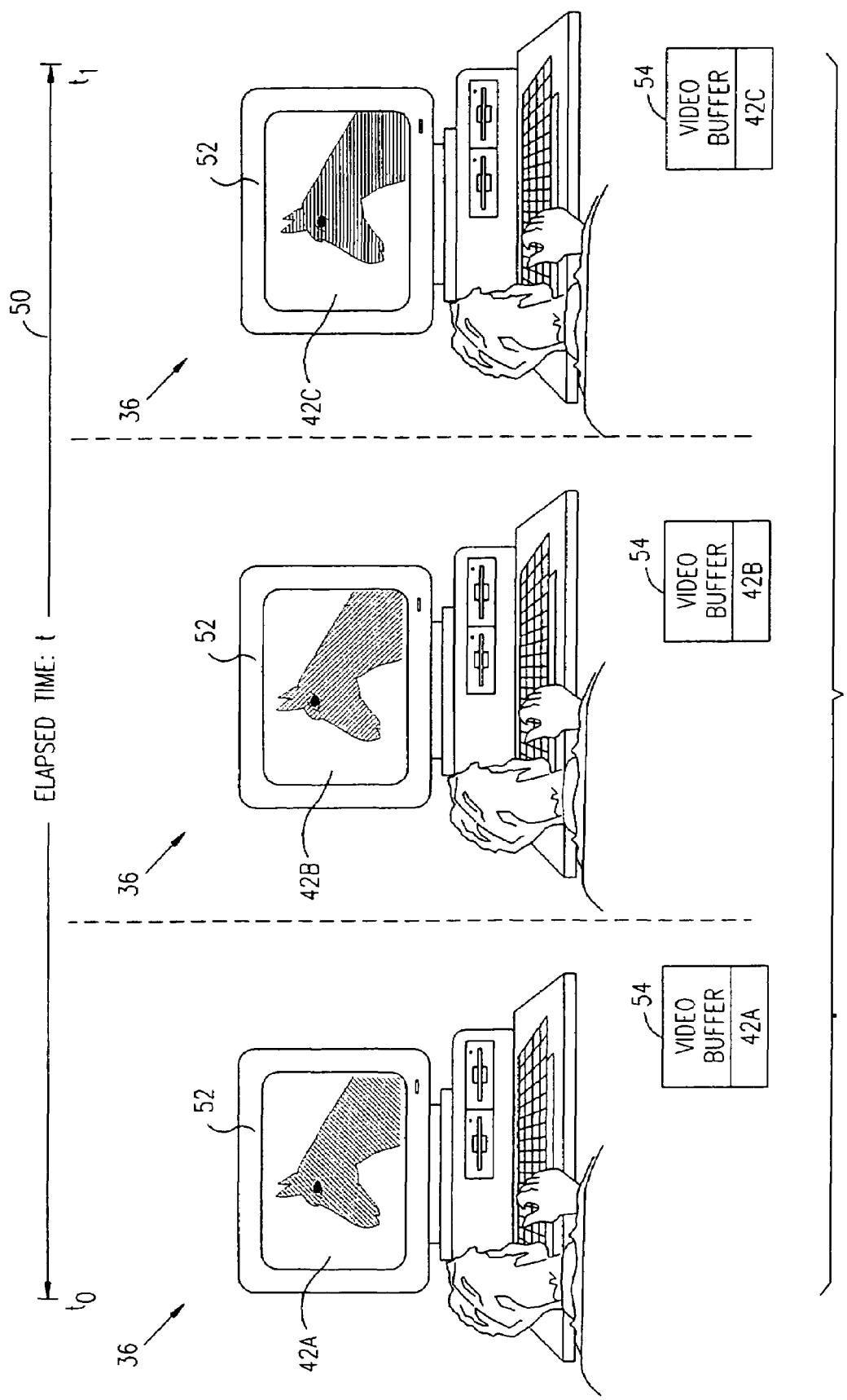
FIGS. 5A and 5B, taken together, are simplified pictorial flow illustrations of a method of displaying the sub-images of FIG. 3.

Reference is now made to FIG. 1 which is a simplified pictorial illustration of a system 10 for preventing unauthorized reuse of text, the system constructed and operative in accordance with a preferred embodiment of the present invention. System 10 preferably includes a communications network 12, such as the Internet, with a server 14 connected to communications network 12. A client 16 is also shown connected to communications network 12 and typically comprises any known computer terminal configured for communication via network 12 as is well known. Server 14 typically includes a storage area 18 that is accessible to clients and a storage area 20 that is not accessible to clients.

Typical operation of system 10 begins with client 16 sending a request for textual information, such as a document 22, to server 14 via network 12. The request may be made using known means, such as by selecting a hyperlink to a World Wide Web page using a browser. By "textual information" it is meant information that is to be presented as text, such as a news article or the results of a search. It is a particular feature of the invention that server 14 stores textual information in a text-editable format, such as in HTML or other known format, in storage area 20 that may not be directly accessed by clients. By "text-editable" it is meant that the textual information in its present form could be copied as text and reused, such as by pasting the copied text into a word processor and deleting words, etc.

Upon receiving the request from client 16, server 14 determines whether the textual information sought is in area 18 that is accessible to client 16, or in area 20 that is not accessible to client 16. If the textual information is in area 20, server 14 renders the textual information on line into a non-text-editable format, such as a document 24, using methods known in the art. By "non-text-editable" it is meant that the textual information in its present form could not be copied as text and reused, such as by pasting the copied text into a word processor and deleting words, etc. For example, search results may be converted from a text-editable format to a non-text-editable format by rendering the text into a graphical format, such as GIF or JPEG, or by performing text-to-speech synthesis.

Upon rendering the textual information into a non-text-editable format, server 14 may then send the non-text-editable textual information over network 12 to client 16 where it may be output to a device such as a computer display or printer. Alternatively, server 14 may store the non-text-editable information in area 18 that is accessible to client 16. Server 12 may then generate an HTML document including a hyperlink to the rendered text and send it to client 16. Client 16 then selects the hyperlink and retrieves the rendered text from area 18. In this manner, text in HTML format that itself includes hyperlinks may be rendered into a graphical client map that preserves both the textual presentation as well as the hyperlinks.

Additional reference is now made to FIG. 2 in which server 14 is shown as typically including a filter 26 which determines whether or not requests are for textual information and whether the textual information requested is stored in area 18 or area 20. Server 14 also includes a rendering engine 28 capable of rendering HTML or other text elements to graphical format as is well known in the art. One such rendering engine is NGLAYOUT, commercially available from Netscape Communications Corporation.

Reference is now made to FIG. 3 which is a simplified pictorial illustration of a system 30 for preventing unauthorized reuse of graphical images, the system constructed and operative in accordance with a preferred embodiment of the present invention. System 30 preferably includes a communications network 32, a server 34 connected to communications network 32, and client 36, similar respectively to network 12, server 14, and client 16 as described with reference to FIG. 1 except as otherwise described herein. Server 34 typically includes a storage area 38 that is accessible to clients and a storage area 40 that is not accessible to clients.

Typical operation of system 30 begins with client 36 sending a request for a graphical image, such as an image 42, to server 34 via network 32. The request may be made using known means, such as by selecting a hyperlink to a World Wide Web page using a browser. It is a particular feature of the invention that information that server 34 store graphical images in storage area 40 that may not be directly accessed by clients.

Upon receiving the request from client 36, server 34 determines whether the graphical image sought is in area 38 that is accessible to client 36, or in area 40 that is not accessible to client 36. If the graphical image is in area 40, server 34 decomposes the graphical image on line into a number of sub-images using methods known in the art. For example, a color image of a horse may be decomposed into a number of color-separated sub-images, such as sub-images 42A–42C being separated into red, green, and blue components respectively, using known color separation techniques. Alternatively or additionally, interference patterns may be randomly introduced into multiple copies of an image. Any known image decomposition method may be used provided that no sub-image, when viewed independently, may be visually perceived to substantially resemble the graphical image from which it was derived.

Upon decomposing the graphical image into sub-images, server 34 may then send the sub-images 42A–42C over network 32 to client 36 where it may be output such as via a computer display in a manner that is visually perceived to substantially resemble the original graphical image 42, such as is known in the art using techniques such as animated GIF. Alternatively, server 34 may store the sub-images in area 38 that is accessible to client 36. Server 32 may then generate an HTML document including a hyperlink to the rendered sub-images and send it to client 36. Client 36 then selects the hyperlink and retrieves the sub-images from area 18. Server 34 may also provide an applet 44 to client 36 for controlling the display of the sub-images at client 36.

Additional reference is now made to FIG. 4 in which server 34 is shown as typically including a filter 46 which determines whether or not requests are for graphical images and whether the graphical image requested is stored in area 38 or area 40. Server 34 also includes a decomposition engine 48 capable of performing color separations or introducing interference patterns into multiple copies of an image as is known in the art.

Figure 5B:
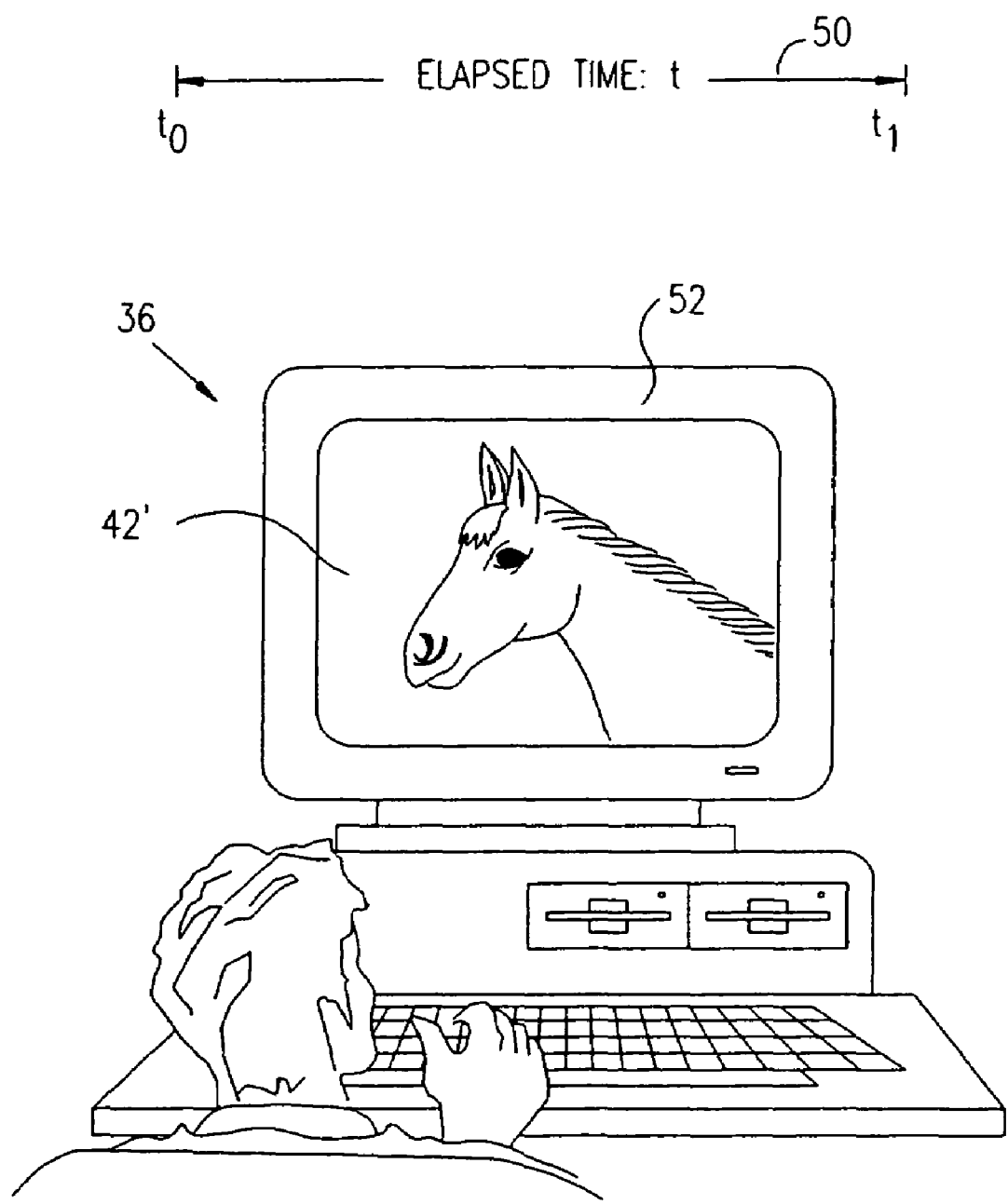

Additional reference is now made to FIGS. 5A and 5B which, taken together, are simplified pictorial flow illustrations of sub-images 42A–42C being displayed on client 36. Sub-images 42A, 42B, and 42C are shown being displayed on a computer display 52 of client 36 in succession over a time period t starting at time index $t_0$ and concluding at a time index $t_1$ of a time line 50. A video buffer 54 associated with display 52 contains the sub-image being currently displayed. It is a particular feature of the invention that at no time does video buffer 54 contain more than one entire sub-image. FIG. 5B shows the result of displaying sub-images 42A–42C in succession over time period t, with the sub-images being visually perceived as a composite image 42' which substantially resembles graphical image 42, as is well known in the art of visual perception.

Figure 5C:
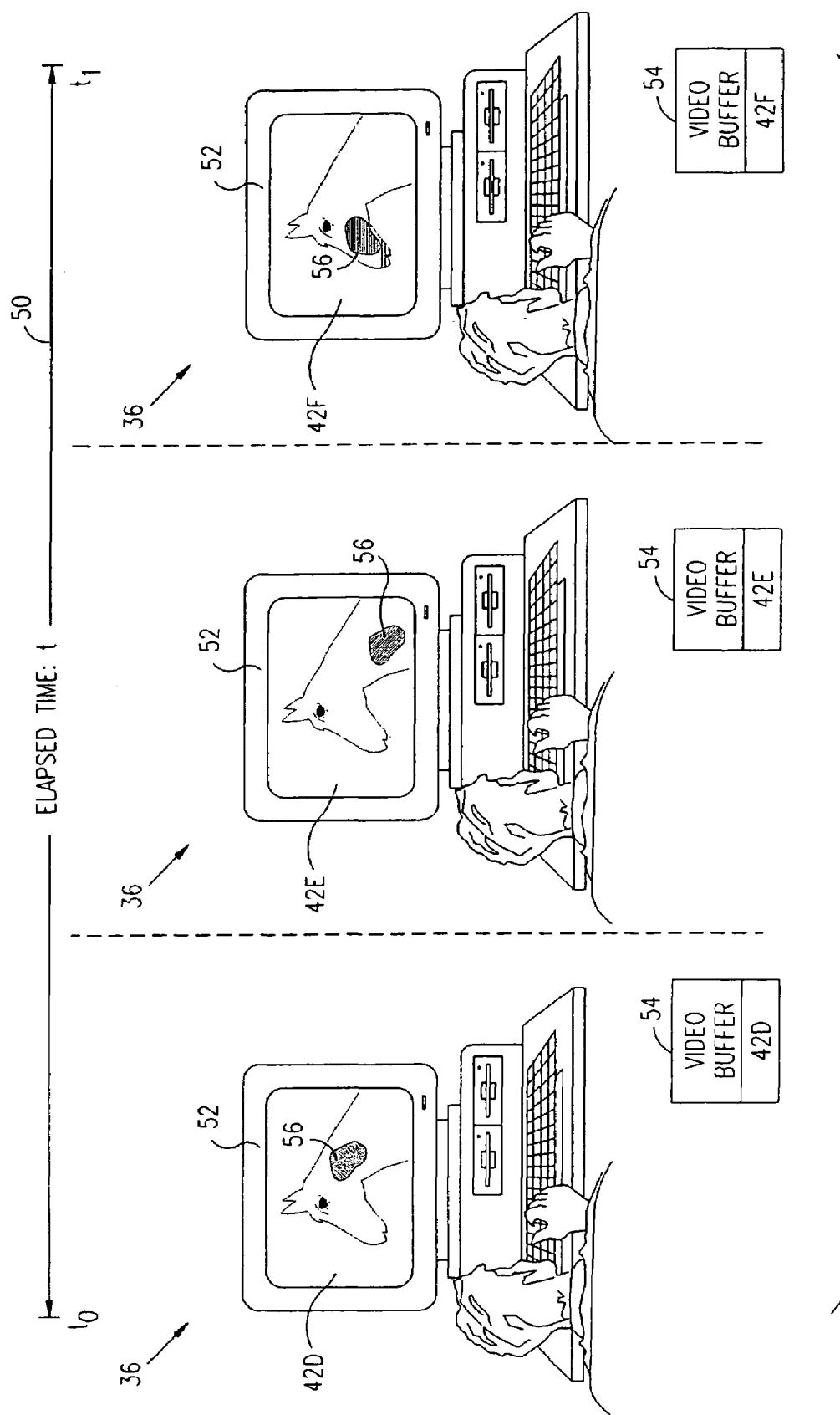

FIG. 5C is functionally equivalent to FIG. 5A with the exception that sub-images 42A–42C of FIG. 5A are replaced with sub-images 42D, 42E, and 42F representing multiple copies of image 42 (FIG. 3) into which interference patterns 56 have been introduced. When displayed in the manner described in FIG. 5B it is believed that composite image 42' may be visually perceived to substantially resemble graphical image 42 where the interference patterns 56 are visually discounted.

Reference is now made to FIG. 6 which is a simplified pictorial illustration of a system 60 for preventing unauthorized reuse of software, the system constructed and operative in accordance with a preferred embodiment of the present invention. System 60 preferably includes a communications network 62, a server 64 connected to communications network 62, and client 66, similar respectively to network 12, server 14, and client 16 as described with reference to FIG. 1 except as otherwise described herein. Server 64 typically includes a restricted-access storage area 68, a software application such as an applet 70, and apparatus for validating passwords, such as a table 72 of valid passwords.

Typical operation of system 60 begins with client 66 sending a request for applet 70 to server 64 via network 62. The request may be made using known means, such as by selecting a hyperlink to a World Wide Web page using a browser. Upon receiving the request from client 66, server 64 preferably generates a unique password which it stores in table 72. Server 64 then sends the applet along with the password to client 66. The password may be embedded into the applet, such as in a predetermined location within the applet code.

Client 66 may use the applet to send requests to server 64 for information stored in restricted access storage 68. The requests are preferably accompanied by the password. Upon receiving the request, server 64 authenticates the password by looking it up in table 72. If the password is valid, server 64 provides the information requested from restricted access storage 68 to client 66.

It is a particular feature of the present invention for server 64 to invalidate a password in table 72, such as by removing it from table 72, upon the occurrence of an invalidation event. Such an invalidation event may include the arrival of a predetermined time, the passage of a predetermined amount of time from when a request was last received, and the detection of a loss of communication with the client.

Additional reference is now made to FIG. 7 in which server 64 is shown as typically including a password generator 74 for generating passwords and, optionally, inserting a password, such as a password 76, into the code of applet 70. Server 64 also preferably comprises invalidation apparatus 78 for invalidating passwords as described above.

It is appreciated that components of the present invention may be implemented in computer hardware, software, or any suitable combination thereof using conventional techniques.

It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination.

It will be appreciated by persons skilled in the art that the present invention is not limited by what has been particularly shown and described hereinabove. Rather the scope of the present invention is defined only by the claims that follow:

What is claimed is:

1. A method for providing textual information in a network environment, the method comprising:
   receiving at a server connected to a network from a computer terminal connected to said network, a request via said network for text-editable data;
   determining whether said text-editable data is stored in a first storage area of said server that is inaccessible to said computer terminal, or in a second storage area of said server that is accessible to said computer terminal;
   if said determining determines that said text-editable data is stored in the first storage area, then:
      converting said text-editable data into non-text-editable data on line upon receiving said request; and
      sending said non-text-editable data via said network from said server to said computer terminal; and
   if said determining determines that said text-editable data is stored in the second storage area, then:
      sending said text-editable data via said network from said server to said computer terminal,
   thereby enabling the server to securely store the text-editable data in the first storage area by conditionally converting the text-editable data into non-text-editable data and by sending the non-text-editable data instead of the text-editable data when a request is received for the text-editable data.

2. A method according to claim 1 wherein said converting comprises converting said text-editable data into a non-text-editable graphical representation of said text-editable data.

3. A method according to claim 2 wherein said converting comprises converting said text-editable data into said non-text-editable graphical representation wherein said graphical representation comprises at least one hyperlink.

4. A method according to claim 1 and further comprising displaying said non-text-editable data via a computer terminal display.

5. A method according to claim 1 wherein said converting is performed at said server.

6. A network-based textual information system comprising:
   a computer terminal operative to send a request via a-network for text-editable data; and
   a server comprising:
      a first storage area that is inaccessible to said computer terminal; and
      a second storage area that is accessible to said computer terminal,
   said server being operative to
      receive said request;
      determine whether said text-editable data is stored (i) in said first storage area, or (ii) in said second storage area;
      in case (i):
         convert said text-editable data into non-text-editable data on line upon receiving said request; and
         send said non-text-editable data to said computer terminal via said network; and
      in case (ii):
         send said text-editable data to said computer terminal via said network,
   thereby enabling the server to securely store the text-editable data in the first storage area by conditionally converting the text-editable data into non-text-editable data and by sending the non-text-editable data instead of the text-editable data when a request is received for the text-editable data.

7. A system according to claim 6 wherein said non-text-editable data comprises a non-text-editable graphical representation of said text-editable data.

8. A system according to claim 7 wherein said non-text-editable graphical representation comprises at least one hyperlink.

* * * * *